United States Patent [19]

Irube et al.

[11] Patent Number: 4,985,199

[45] Date of Patent: Jan. 15, 1991

[54] FUEL SPACER OF SEPARATE CELL TYPE AND MANUFACTURING METHOD THEREFOR

[75] Inventors: Makoto Irube; Junjiro Nakajima, both of Hitachi; Hajime Umehara, Katsuta; Nobuo Tada; Masayoshi Ajima, both of Hitachi, all of Japan

[73] Assignee: Hitachi, Ltd., Tokyo, Japan

[21] Appl. No.: 250,111

[22] Filed: Sep. 28, 1988

[30] Foreign Application Priority Data

Sep. 28, 1987 [JP] Japan .................................. 62-243287

[51] Int. Cl.⁵ ............................................. G21C 3/34
[52] U.S. Cl. .................................... 376/442; 376/261; 29/906
[58] Field of Search ................ 376/442, 438, 445, 446, 376/260, 261; 29/430, 906 X

[56] References Cited

U.S. PATENT DOCUMENTS

| | | | |
|---|---|---|---|
| 3,886,038 | 5/1975 | Raven | 376/439 |
| 4,089,741 | 5/1978 | Patterson | 376/439 |
| 4,508,679 | 4/1985 | Matzner | 376/438 |
| 4,869,965 | 9/1989 | White | 376/260 |

FOREIGN PATENT DOCUMENTS

| | | |
|---|---|---|
| 3325777 | 2/1984 | Fed. Rep. of Germany . |
| 2614077 | 5/1986 | Fed. Rep. of Germany . |
| 3413981 | 6/1987 | Fed. Rep. of Germany . |
| 3433101 | 10/1987 | Fed. Rep. of Germany . |
| 59-65287 | 4/1984 | Japan . |

*Primary Examiner*—Donald P. Walsh
*Attorney, Agent, or Firm*—Antonelli, Terry, Stout & Kraus

[57] ABSTRACT

Each of cylindrical members composing a fuel spacer of separate cell type is formed at a edge portion thereof with a positioning notch or a positioning projection, which is located just opposite to one of fuel rod supporting projections formed on the inner surface of the cylindrical member. In manufacturing of the fuel spacer, the positioning notches or projections of the cylindrical members are engaged with the positioning projections or recesses formed on fuel spacer assembly jigs for precise and easy positioning of cylindrical members.

9 Claims, 4 Drawing Sheets

FUEL SPACER OF SEPARATE CELL TYPE AND MANUFACTURING METHOD THEREFOR

BACKGROUND OF THE INVENTION

1. Field of the Invention

The present invention relates to a fuel spacer of separate cell type used for supporting a fuel assembly in a nuclear reactor, and a manufacturing method therefor.

2. Description of the Prior Art

U.S. Pat. No. 4,508,679 discloses a fuel spacer of separate cell type for supporting a fuel assembly in a nuclear reactor. This fuel spacer is composed of a number of cylindrical members or separate cells for receiving fuel rods therein. These cylindrical members are arranged in a square array with adjacent members welded to each other in those contact portion, and the periphery of the group of the arrayed members is surrounded by side bands which are also welded to cylindrical members in the contact portion thereof. To support a fuel rod, each of the cylindrical members is mounted with a spring and formed with projections on its inner surface.

As seen in FIGS. 3A, 3B and 3C which show a fuel spacer disclosed in the above U.S. Patent, the side wall of the cylindrical member 3 is formed with a slit 7 of laid-U shape for receiving a spring and with linear slits 9 for forming projections 5.

The spring for this fuel spacer is a leaf spring of a continuous loop type formed into a circular ring having a sectional rhombic shape. When the spring is fitted to one cylindrical member 3, one half member of the loop type spring is inserted through the slit 7 of laid-U shape into inside of one cylindrical member 3, and then the cylindrical member is rotated relative to the spring so that the overhang portion 8 formed with the slit 7 of laid-U shape of the side wall may enter into one opening of the spring 4 of loop type, causing the portion 8 to be covered by the leaf spring. Next, another cylindrical member is positioned adjacent to said one cylindrical member with their slits 7 of laid-U shape opposing to each other, and rotated relative to the spring in the different direction so that its overhang portion 8 may also enter into other opening of the same loop type spring. Thus, one half of the spring inserts into inside of one cylindrical member, while another half of the same inserts into inside of the other adjacent cylindrical member. In this situation of the cylindrical members and the spring, the adjacent cylindrical members are connected with each other by welding at their upper and lower ends, keeping the spring to the cylindrical members.

A number of paired cylindrical members thus combined with each other are so arranged to form a square array of cylindrical members as mentioned above, and each of the cylindrical members in the array is connected with adjacent cylindrical members by welding at their contact portions, only excluding connections between the paired members which have been already welded to each other for securing the spring. At the same time, side bands are disposed around the group of the arrayed members, and connected to adjacent cylindrical members by welding at their contact portions.

In the assembly process by the use of welding for such a fuel spacer of separate cell type as mentioned above, in consideration of the spacer function of supporting fuel rods, it is much required to locate the cylindrical members at exact positions and in exact directions without requiring any difficult work. With respect to this subject, there is found no prior art sufficiently attending thereto, yet.

SUMMARY OF THE INVENTION

The object of the present invention is to provide a fuel spacer of separate cell type which can be precisely and easily assembled by welding without any risk of erroneous assembly, and to provide a manufacturing method therefor.

This object is achieved by forming each of the cylindrical members or separate cells, which are main constituent members of the fuel spacer of separate cell type, with a positioning notch or a positioning projection located at an edge portion thereof. In assembly process of the fuel spacer, these positioning notches or projections engage with projections or recesses formed on an assembly jig or jigs for the fuel spacer, assuring precise and easy positioning of the cylindrical members without any risk of an erroneous assembly.

DETAILED DESCRIPTION OF THE PREFERRED EMBODIMENTS

Figure 1A:
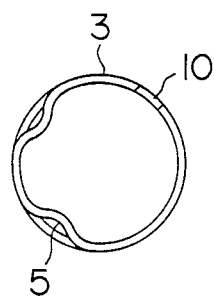
Fig. 1A is a plan view of the cylindrical member (separate cell) according to the present invention.
Figure 1B:
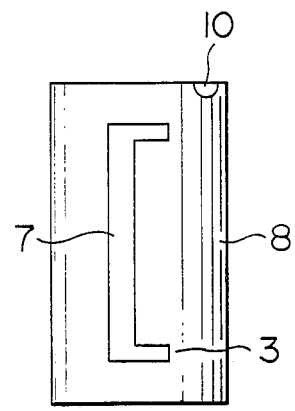
FIG. 1B is a side view of the cylindrical member shown in FIG. 1.
Figure 3A:
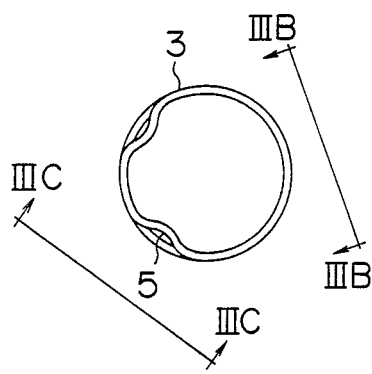
FIG. 3A is a plan view of a cylindrical member of a prior art.
Figure 3B:
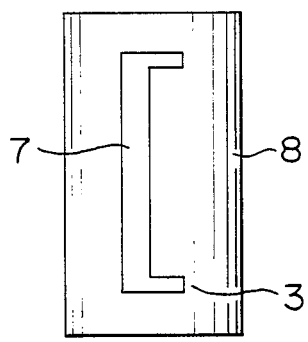
FIG. 3B is a side view taken in the direction of the arrows substantially along line 3B—3B of FIG. 3A showing a U-shape slit.
Figure 3C:
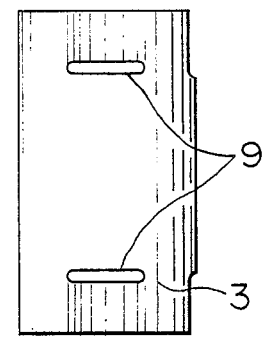
FIG. 3C is a side view taken in the direction of the arrows substantially along line 3C—3C of FIG. 3A showing linear slits for forming projections.
Figure 2A:
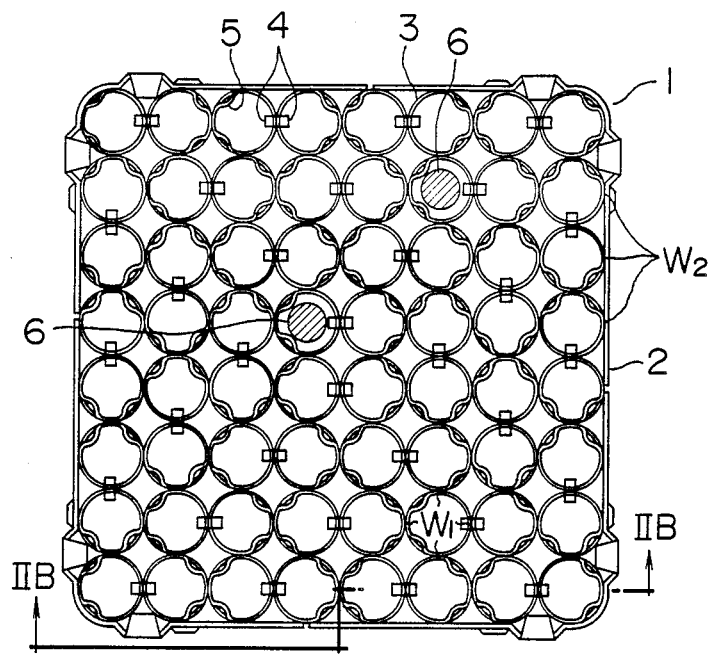
FIG. 2A is a plan view of the fuel spacer of separate cell type according to the present invention.
Figure 2B:
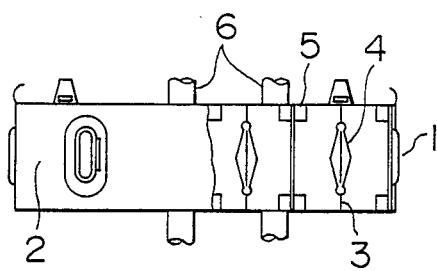
FIG. 2B is a side view, partially in cross section, taken along line 2B—2B of FIG. 2A.

A fuel spacer 1 of separate cell type in accordance with an embodiment of the invention is generally shown in a plan view of FIG. 2A and a side view of FIG. 2B. A fuel spacer 1 is constructed by arranging a number of cylindrical members (separate cells) 3 for receiving fuel rods 6 within those members into a square array form, connecting adjacent members with each other by welding at their contact point (welding portions $W_1$), disposing strip-like side bands 2 around the periphery of the group of cylindrical members, and connecting the side bands 2 with the adjacent cylindrical members by welding at their contact points (welding portions $W_2$). As shown in FIGS. 1A and 1B, each of the cylindrical members (separate cell) 3 is formed with two projections 5 for supporting a fuel rod by cutting and arising it and a laid-U shaped slit 7 for mounting a spring 4 on the cylindrical member. The spring 4 is provided to support a fuel rod in the cylindrical member, and is a leaf spring formed into a continuous loop having rhombic section. The spring 4 is mounted on the overhang portion 8 of the cylindrical member 3 defined by the U shaped slit 7 in the manner as mentioned before. The spring 4 is located just opposite to the middle point between two projections 5.

In the embodiment of the present invention, as shown in FIGS. 1A and 1B, the cylindrical member (separate cell) 3 of the fuel spacer of the separate cell type is formed with a notch 10 on a edge portion thereof at a circumferential position. The positions for forming the notch 10 in the member 3 is in the opposite direction to one of the projections 5. This is based on the reason as follows. That is, since each of the cylindrical members (separate cell) 3 is arranged into a square array as shown in FIG. 2A) and there are four welding portions of each members 3 in the direction of the U-shaped slit 7 and the normal direction thereto, it is difficult to form the notch 10 around those portions Also, the portions of the projections 5 and the neighborhood thereof are unsuitable as ones for forming the notch 10. Accordingly, the peripheral position for forming the notch 10 is either one of two portions opposite to the projections 5. Thus, since these positions are in the middle point between four welding portions of the cylindrical member 3, these are the suitable positions in consideration of those strength, so that those positions do not become the portions of stress concentration in an earthquake-proof structure when the fuel spacer is really used in a nuclear reactor.

The shape of the notch 10 is not a mere semicircle, but is preferably somewhat elongated so that the depth of the notch become slightly greater than the radius of the semicircle. This is based on the reason that such a shape of the notch 10 is selected not only in consideration of the relation between the fuel spacer and the assembly jigs, which will be mentioned later, but also in consideration that, when the positioning projections on the jig has an exact semicircular shape, such a notch shape having a greater depth is able to prevent any detachment of the cylindrical member from the surface of the jig, making it possible for the spacer setting to be sure and stable.

Figure 4:
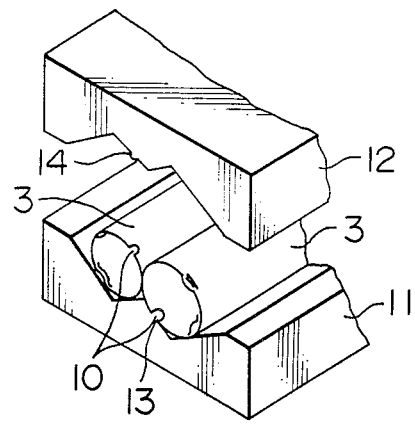
FIG. 4 is a perspective view of a cell pairing jig used for joining a pair of separate cells according to the present invention.

FIG. 4 shows an example of a cell pairing jig which is used for connecting two cylindrical members with each other. This jig is composed of a lower jig half 11 and an upper jig half 12, each having two grooves of triangular crosssection for receiving two adjacent cylindrical members 3 and a positioning projection 13 or 14 to be engaged with the notch 10 of the cylindrical member. By mating the two jig halves with each other with two cylindrical members put therebetween, the positional relation between the two cylindrical members is precisely defined and a easy welding is assured. It should be noticed that, when two cylindrical members are assembled and welded by the use of the cell pairling jig as above-mentioned, a spring 4 is necessary to have been mounted on the two cylindrical members 3 previously.

Figure 5:
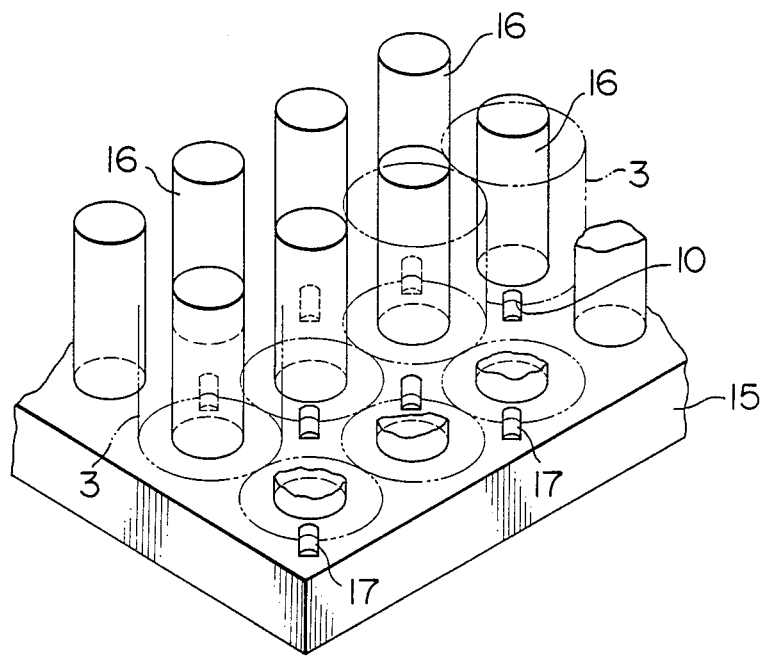
FIG. 5 is a perspective view of a spacer assembly jig.

FIG. 5 shows an example of a fuel spacer assembly jig used for assembling the abovementioned paired cylindrical members (separate cell) into a fuel spacer. This jig is composed of a base 15 and dummy fuel rods 16 mounted on the base 15 in the same pattern as real fuel rods. The base 15 is formed with positioning projections 17 which are shaped by laying the cylindrical member having a semicircular section on the surface of the base and located correspondingly to the positions of the notches 10 of the arranged cylindrical members. Pairs of the cylindrical members (separate cell) 3 paired through the abovementioned pairing process are fitted on the dummy fuel rods 16 with their notches 10 engaging with the positioning projections 17 of the base 15, thereby assuring correct positioning of the cylindrical members and easy welding and assembling works. Further, since all of the positioning projections 17 are directed in the predetermined direction as shown in FIG. 5, the projections 17 are easily and precisely fabricated on the base 15 of the spacer assembly jig.

Although there should be the assembling process of the fuel spacer mentioned above including two steps, i.e. a step using the jig shown in FIG. 4 and another step using the jig shown in FIG. 5, it is also possible to achieve the whole process in one step using the spacer assembly jig shown in FIG. 5, if there is no problem in welding work.

As explained above, by forming each of the cylindrical members (separate cell) with a notch, the assembly work of the fuel spacer is made easy and precise and prevented from any erroneous operation, assuring a sufficient spacer function in a fuel assembly having the above spacer and maintaining the suitable spaces among the fuel rods.

Further, the notch 10 in the cylindrical member has an important additional function which is effective for positioning an individual cylindrical member (separate cell) in the work process before welded to another cylindrical member. Namely, since the cylindrical member (separate cell) is made from thin sheet, the slits 7, 9 and the notch 10 are not permitted to be punched simultaneously through a single punching process using a single set of metal dies. Therefore, the punching process is required to be divided into several steps, each of which requires a special punching die. When several punching steps are included, much care must be taken for maintaining precise relative positions among the slits, the projections and the notch. Under these circumstances, the notch 10 is effectively used again as a positioning means in each punching step. In this case, the notch 10 should be punched in the first punching step. In the following process, it is possible to position the cylindrical member by using the notch 10 and continue further process as well as the case of welding process.

Figure 6:
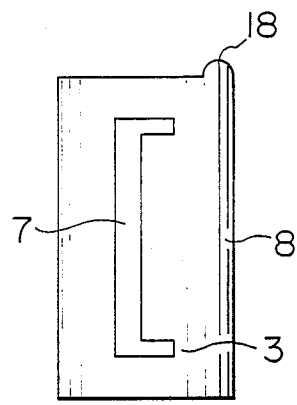
FIG. 6 is a side view of a fuel spacer of separate cell type according to another embodiment of the present invention.

As shown in FIG. 6, the notch 10 of the cylindrical member 3 of the abovementioned embodiment is possible to be replaced by a projection 18 located at the same position as one of the notch 10. In this case, the positioning projections 13 and 14 of the cell pairing jig shown in FIG. 4 and the positioning projections 17 of the spacer assembly jig shown in FIG. 5 should be also replaced by positioning means of recess shape. The same positioning function is maintained also in this embodiment.

Figure 7:
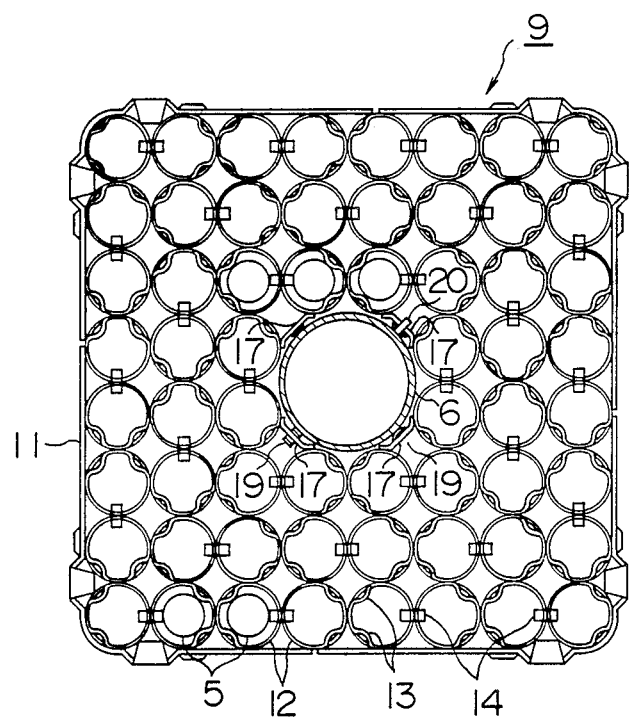
FIG. 7 is a plan view of a fuel spacer of separate cell type according to further another embodiment of the present invention.

In the abovementioned embodiments, as shown in FIG. 2A, the cylindrical members are arranged in a square array including no vacant space therein. The present invention, however, can be applied not only to spacers having solidly arranged cylindrical members, but also to the other spacers including a vacant spaces therein, for example, a spacer shown in FIG. 7, which appears in U.S. Pat. No. 4,686,079. For such a spacer configuration as shown in the U.S. Patent, where a water rod 6 having a diameter greater than that of the cylindrical member is disposed at the central portion of the spacer, the water rod is provided with projections 20 on its outer surface, while the cylindrical members adjacent to the water rod are provided with bridge members 17 connecting adjacent two of the cylindrical members. The projections 20 of the water rod are engaged with the bridge members 17 by rotating the water rod relative to the fuel spacer.

As mentioned above, according to the present invention, when a fuel spacer of separate cell type is assembled by welding, precise and easy positioning of each cylindrical member can be obtained and erroneous operations in assembly work can be prevented.

What is claimed is:

1. A fuel spacer of separate cell type including a number of cylindrical members (separate cell) connected with each other and each provided with two projections for supporting a fuel rod, fuel rod supporting springs each mounted on a contact portion of adjacent two of said cylindrical members and located just opposite to the middle point between said two projections, and striplike side bands surrounding the group of said connected cylindrical members, comprising:
   a positioning notch or positioning projection formed on an edge portion of each of said cylindrical members; and
   said positioning notch or positioning projection being located opposite to one of said two projections for supporting a fuel rod.

2. A fuel spacer according to claim 1, wherein said positioning notch has a substantially semicircular shape and has a depth greater than the radius of said semicircular shape.

3. A manufacturing method for a fuel spacer of separate cell type, comprising the steps of:
   providing a pair of cylindrical members having two fuel rod supporting projections and a positioning notch or a positioning projection formed on an edge thereof, and said pair of cylindrical members being mounted with a fuel rod supporting spring at a portion between those members,
   providing a fuel spacer assembly jig including a base body and a dummy fuel rod perpendicularly mounted on said base body in the same pattern as one of the fuel rod, and said base body being formed with a number of positioning projections or positioning recesses for engaging with said positioning notches or positioning projections formed on said cylindrical members,
   arranging a number of said pair of cylindrical members so as to fit on said dummy fuel rods of the spacer assembly jig with said positioning notches or said positioning projections of the cylindrical members engaging with said positioning projections or said positioning recesses of said spacer assembly jig, and
   connecting each of said arranged cylindrical members with cylindrical members adjacent thereto by welding.

4. A manufacturing method according to claim 3, before said step of arranging cylindrical members on the spacer assembly jig, further comprising the steps of,
   providing a cell pairing jig having an upper jig half and a lower jig half, each jig half being formed with grooves receiving said paired cylindrical members and with a positioning projection or a positioning recess to be engaged with said positioning notch or said positioning projection of each cylindrical member,
   positioning each of said paired cylindrical members relative to each other by using said cell pairing jig, and
   connecting said paired cylindrical members with each other by welding as holded in said cell pairing jig.

5. A fuel spacer according to claim 1, wherein said positioning notch or positioning projection formed on the edge portion of each of said cylindrical members is arranged for engagement with a corresponding positioning projection or positioning recess formed on a jig member for enabling assembly of said fuel spacer.

6. A fuel spacer according to claim 2, wherein said positioning notch or positioning projection formed on the edge portion of each of said cylindrical members is arranged for engagement with a corresponding positioning projection or positioning recess formed on a jig member for enabling assembly of said fuel spacer.

7. A manufacturing method for a fuel spacer of separate cell type, comprising the steps of:
   providing at least two cylindrical members having two fuel rod supporting projections, and fuel rod supporting springs each mounted on a contact portion of the at least two adjacent cylindrical members and located just opposite to a middle point between said two fuel rod supporting projections;
   providing a positioning notch or positioning projection on an edge portion of each of said cylindrical members, and locating said positioning notch or positioning projection opposite one of said two fuel rod supporting projections; and
   providing striplike side bands surrounding a group of cylindrical members connected with each other.

8. A manufacturing method according to claim 7, further comprising the step of providing said positioning notch with a substantially semicircular shape and a depth greater than the radius of said semicircular shape.

9. A manufacturing method according to claim 7, further comprising the steps of:
   providing a fuel spacer assembly jig including a base body and a dummy fuel rod perpendicularly mounted on said base body in the same pattern as one of the fuel rods, said base body being formed with a number of positioning projections or positioning recesses for engagement with said positioning notches or positioning projections formed on said cylindrical members;
   arranging a number of said pair of cylindrical members so as to fit on dummy fuel rods of the spacer assembly jig with said positioning notches or said positioning projections of the cylindrical members engaging with said positioning projections or said positioning recesses of said spacer assembly jig; and
   connecting each of said arranged cylindrical members with cylindrical members adjacent thereto by welding.

* * * * *